(12) United States Patent
Gasiorowski et al.

(10) Patent No.: US 12,467,850 B2
(45) Date of Patent: Nov. 11, 2025

(54) DEVICE AND METHOD FOR MEASURING A SUBSTRATE

(71) Applicant: EV Group E. Thallner GmbH, St. Florian am Inn (AT)

(72) Inventors: Jacek Gasiorowski, Schärding (AT); Markus Wimplinger, Ried im Innkreis (AT)

(73) Assignee: EV GROUP E. THALLNER GMBH, St. Florian am Inn (AT)

( * ) Notice: Subject to any disclaimer, the term of this patent is extended or adjusted under 35 U.S.C. 154(b) by 274 days.

(21) Appl. No.: 17/774,612

(22) PCT Filed: Nov. 28, 2019

(86) PCT No.: PCT/EP2019/082881
§ 371 (c)(1),
(2) Date: May 5, 2022

(87) PCT Pub. No.: WO2021/104631
PCT Pub. Date: Jun. 3, 2021

(65) Prior Publication Data
US 2022/0390356 A1    Dec. 8, 2022

(51) Int. Cl.
*G01N 21/21*    (2006.01)
*G01N 21/95*    (2006.01)
(Continued)

(52) U.S. Cl.
CPC ....... *G01N 21/211* (2013.01); *G01N 21/9501* (2013.01); *G06F 30/20* (2020.01); *G01N 21/25* (2013.01); *G01N 2201/06113* (2013.01)

(58) Field of Classification Search
CPC .. G01N 21/25; G01N 21/211; G01N 21/9501; G01N 2201/06113;
(Continued)

(56) References Cited

U.S. PATENT DOCUMENTS

| | | |
|---|---|---|
| 6,912,056 B2 | 6/2005 | Hyun et al. |
| 7,196,793 B2 | 3/2007 | Nabatova-Gabain et al. |
| (Continued) | | |

FOREIGN PATENT DOCUMENTS

| | | |
|---|---|---|
| CN | 1619288 A | 5/2005 |
| CN | 101231239 A | 7/2008 |
| (Continued) | | |

OTHER PUBLICATIONS

Vuv-Vase Ellipsometer, J.A. Woollam Co. Ellipsometry Solutions, https://web.archive.org/web/20160922031546/https://www.jawoollam.com/products/vuv-vase-ellipsometer#tab-id-1 (Year: 2016).*

(Continued)

*Primary Examiner* — Jamil Ahmed
(74) *Attorney, Agent, or Firm* — RENNER, OTTO, BOISSELLE & SKLAR, LLP (57) ABSTRACT

A method for measuring a multilayered substrate, particularly with at least one structure with critical dimensions, the method including the steps of (a) producing the substrate with a plurality of layers, particularly with a structure, wherein the dimensions of the layers and in particular the structures are known, (b) measuring the substrate using at least one measuring technology, (c) creating a simulation of the substrate using the measurement results from the measurement of the substrate, (d) comparing the measurement results with simulation results from the simulation of the substrate, and (e1) optimizing the simulation and renewed creation of a simulation of the substrate using the measurement results from the measurement of the substrate, in the event that there is a deviation of the measurement results from the simulation results, or (e2) calculating parameters of further substrates, in the event that the measurement results correspond to the simulation results.

13 Claims, 5 Drawing Sheets

(51) Int. Cl.
*G06F 30/20* (2020.01)
*G01N 21/25* (2006.01)

(58) Field of Classification Search
CPC .......... G01N 2021/213; G01B 2210/56; G10B 11/02; G10B 11/065; G03F 7/70625; G06F 30/20
See application file for complete search history.

(56) References Cited

U.S. PATENT DOCUMENTS

| | | | |
|---|---|---|---|
| 7,268,876 B1 | 9/2007 | Johs | |
| 7,289,219 B2 | 10/2007 | Norton et al. | |
| 7,394,554 B2 | 7/2008 | Vuong et al. | |
| 7,502,101 B2 | 3/2009 | Raymond et al. | |
| 7,700,247 B2 | 4/2010 | Ausschnitt | |
| 9,977,340 B2 | 5/2018 | Aben et al. | |
| 2003/0071994 A1* | 4/2003 | Borden | G01N 21/9501 356/326 |
| 2007/0046953 A1* | 3/2007 | De Groot | G01B 9/0209 356/512 |
| 2009/0262332 A1* | 10/2009 | Xu | G01N 21/253 356/331 |

FOREIGN PATENT DOCUMENTS

| | | | | |
|---|---|---|---|---|
| CN | 105737773 A | | 7/2016 | |
| DE | 4108329 C2 | * | 10/1993 | ........... G01B 11/065 |
| DE | 10302868 A1 | | 8/2004 | |
| DE | 112013003491 T5 | | 3/2015 | |
| EP | 1073876 B1 | | 12/2004 | |
| JP | 2002506198 A | | 2/2002 | |
| JP | 2002-116011 A | | 4/2002 | |
| JP | 2005-142535 A | | 6/2005 | |
| JP | 2005-257698 A | | 9/2005 | |
| JP | 2007-522432 A | | 8/2007 | |
| JP | 2013-224945 A | | 10/2013 | |
| WO | 2004068070 A1 | | 8/2004 | |

OTHER PUBLICATIONS

Office Action (with English translation) dated Feb. 7, 2024 from related/corresponding Japanese Patent Application No. 2022-526364.
International Search Report from corresponding International Patent Application No. PCT/EP19/82881, dated Aug. 20, 2020.
J. Nanopart. Res. (2009) 11: 1521-1554.
Zhu, R., Brueck, S. R. J., Dawson, N., Busani, T., Joseph, P., Singhal, S., and Sreenivasan, S. V., "Scatterometry for nanoimprint lithography," Journal of Vacuum Science & Technology B, vol. 34, No. 06K503, 2016.
Patrick, H. J., Germer, T. A., Ding, Y., Ro, H. W., Richter, L. J., Soles, C. L., ,,Scatterometry for in situ measurement of pattern reflow in nanoimprinted polymers, Applied Physics Letters, vol. 93, No. 233105, 2008.
De Groot, Peter J., *Phase Shifting Interferometry*, Chapter—2011, https://www.researchgate.net/publication/265545417; Printout Date: Nov. 19, 2024.
https://en.wikipedia.org/w/index.php?title=Rigorous_coupled-wave_analysis&oldid=1240031473, Print Out Date: Mar. 5, 2025.
https://www.latitudeds.com/post/rigorous-coupled-wave-analysis-a-powerful-tool-for-periodic-electromagnetic-simulations, Print Out Date: Mar. 5, 2025.
First Office Action and Search Report issued in related Chinese Patent Application No. 201980102109.7 dated Apr. 17, 2025.
Chinese Office Action with Search Report issued in related Chinese Patent Application No. 201980102109.7 dated Aug. 30, 2025.

* cited by examiner

DEVICE AND METHOD FOR MEASURING A SUBSTRATE

FIELD OF INVENTION

The invention relates to a device and a method for measuring a substrate.

BACKGROUND OF INVENTION

Challenges for measuring and inspection technology in the production process are increasing due to a stark reduction in critical dimensions (CDs) of structures which are produced on substrates by means of photolithography or nanoimprint lithography.

Conventional imaging methods, such as optical microscopy are limited to structural dimensions above half the optical wavelength, for the most part far above 100 nm, due to the Abbe resolution limit—that is the diffraction-limited resolution. A three-dimensional characterization of structures with critical dimensions is only possible to a limited extent using optical microscopy. In this case, geometric parameters such as structure width, structure height, angles between planes and, in the case of ever smaller structures, even the roughness of the three-dimensional structures are becoming ever more important. Alternative methods for measuring structures, such as transmission electron microscopy (TEM), scanning electron microscopy (SEM) or atomic force microscopy (AFM), are too (time-)intensive in the semiconductor industry and therefore not suitable in process monitoring and in series production. Analogously, the profilometry also is only suitable for determining topography on large surfaces to a limited extent.

In the prior art, conventional imaging methods, such as optical microscopy are combined with non-imaging optical scatterometric measuring methods.

Due to the stark reduction in critical dimensions of structures, which are produced on substrates for example by means of photolithography or nanoimprint lithography, the conventional imaging methods are dispensed with, however.

Classic ellipsometry is used in the prior art in order to measure layer thicknesses and optical material properties, such as refractive index and reflectance. The measurement of coatings must take place without destroying the layers in the process, in order to prevent the substrate or the wafer from being damaged. Primarily, spectroscopic ellipsometry and reflectometry have become established as metrological systems for process control and for process optimization in the semiconductor industry. Generally, relative changes or deviations are detected. Programs are known in the prior art, which are required for simulation and analysis from the measurement of simple systems.

A detailed summary on the subject of spectroscopic ellipsometry and polarimetry for the analysis of materials and systems in the nm range, including thin films, can for example be found in J. Nanopart. Res. (2009) 11: 1521-1554 and is not explained in more detail.

A device and a method for measuring a multilayer on a substrate is specified for example in U.S. Pat. No. 6,912,056B2. The device contains a measuring unit, in order to measure reflected light, wherein the reflected light was reflected by the substrate, on which the multilayer is formed. A multiplicity of formula data are input using an input unit, of which, each datum of the multiplicity of formula data corresponds to a multiplicity of hypothetical multilayers, wherein one of the hypothetical multilayers is initially assumed to be the multilayer which is actually formed on the substrate. A control unit calculates a multiplicity of theoretical spectra, of which, each spectrum specifies at least one thickness of each component layer of the hypothetical multilayer, which is assumed to be the multilayer which is actually formed on the substrate, using a set of the multiplicity of formula data, wherein the measured spectrum is compared with the multiplicity of theoretical spectra, as a result of which a temporary thickness of the multilayer is determined. The calculated temporary thickness must lie within a permissible range, otherwise the selection of the temporary thickness is repeated after changing the formula data. The physical information contains a refractive index and a molar extinction coefficient of each component layer.

U.S. Pat. No. 196,793B2 also uses the data measured using spectroscopic ellipsometry, such as e.g. the polarization change of the radiation ($\psi(\lambda_i)$ and $\Delta(\lambda_i)$) and compares these data with simulated spectra in order to characterize thin two-layer systems on a substrate. The simulated spectra are fitted in the model until the smallest differences between simulated values ($\psi_M(\lambda_i)$ and $\Delta_M(\lambda_i)$) and measured values ($\psi_E(\lambda_i)$ and $\Delta_E(\lambda_i)$)) are obtained, wherein layer thickness(es) $d_{(best)}$ and angle of incidence $\phi_{(best)}$ are varied.

In U.S. Pat. No. 289,219B2 and U.S. Pat. No. 502,101B2, polarimetric scatterometry is used for the measurement of critical dimensions of periodic structures on wafers or semiconductor components.

In U.S. Pat. No. 268,876B1, a minimization algorithm is used by means of non-linear regression or according to the Levenberg-Marquardt method in order to characterize either the removal or the deposition of the outermost layer of a sample in situ by means of spectroscopic ellipsometry.

In Zhu, R., Brueck, S. R. J., Dawson, N., Busani, T., Joseph, P., Singhal, S., and Sreenivasan, S. V., "Scatterometry for nanoimprint lithography," Journal of Vacuum Science & Technology B, Vol. 34, No. 06K503, 2016, variable angle scatterometry is used for characterizing structures which have been produced using nanoimprint lithography. These structures are a wire grid polarizer (WGP) and a photoresist grid. RCWA algorithms were used for model production.

In Patrick, H. J., Germer, T. A., Ding, Y., Ro, H. W., Richter, L. J., Soles, C. L., "Scatterometry for in situ measurement of pattern reflow in nanoimprinted polymers," Applied Physics Letters, Vol. 93, No. 233105, 2008, spectroscopic ellipsometry is used for characterizing grid structures produced from polystyrene using NIL.

The method was used in order to detect changes of the structures after a thermal treatment (annealing). RCWA algorithms were used for model production. The results were compared with AFM measurements.

Reflection ellipsometry has primarily become established in the measurement of thin layers in the semiconductor industry and is therefore explained briefly. For the most part, monolayers are characterized in the prior art. Here, for example, the reflection of linearly polarized, parallel and monochromatic light is measured at a three-phase system, substrate/layer/air. In a three-phase system, reflection and diffraction take place at two boundary surfaces. In the case of reflection at a (multi-)layer system, reflection and diffraction must be taken into account at each individual phase boundary. Either the material-characteristic complex refractive index $\tilde{n}$ of the layer system or the layer thickness can be calculated from the measurable ellipsometric characteristics—the loss angle $\psi$ and the phase difference $\Delta$—which describe the polarization change. Transmission ellipsometry is used for measuring optical properties. As ellipsometry operates in a destruction-free manner, this method is particularly suitable for process control.

In variable angle spectral ellipsometry (VASE), there is a broad coverage of wavelengths, in contrast to monochromatic ellipsometry. Due to the large quantity of data or information, it is possible to calculate more accurate models. Using VASE, it is possible, inter alia, to measure or calculate the following parameters for organic and inorganic materials:

- layer thickness from subnanometre to several micrometres
- surface roughnesses
- refractive index
- electrical conductivity
- absorption
- polymerization state
- mixture compositions
- defects
- optical anisotropy
- material doping
- morphology In the prior art, however, for the most part individual thin transparent or semi-transparent layers or two-layer systems are measured. If multilayer systems are investigated, then there is no structured surface present. Due to the complexity, in the prior art, either multilayer systems or periodic structures are measured. For multilayer systems, smooth surfaces are a prerequisite in the prior art. Further problems in the prior art are often an inadequate accuracy of the simulations from the measurement of complex samples. It is even more difficult if the structures also have even more complex structural forms. Then, adaptation of measurement and simulation is still a problem.

SUMMARY OF INVENTION

The object to be achieved in this invention includes overcoming the problems of the prior art and, in particular, specifying an improved method and an improved device for measuring a multilayered substrate.

This object is achieved with the subject matter of the coordinate patent claims. Advantageous developments of the invention are specified in the dependent claims. All combinations made up of at least two features specified in the description, the claims and/or the figures also fall within the scope of the invention. When value ranges are specified, values lying within the limits mentioned should also be disclosed as limit values and be claimable in any desired combination.

The invention relates to a method for measuring a multilayered substrate, particularly with at least one structure with critical dimensions, particularly with a surface structure with critical dimensions, wherein the method has at least the following steps, particularly the following procedure:

- producing the substrate with a plurality of layers, particularly with a structure, particularly with a structure on a surface of an uppermost layer, wherein the dimensions of the layers and in particular the structures are known,
- measuring the substrate, and in particular the structure, using at least one measuring technology,
- creating a simulation of the substrate using the measurement results from the measurement of the substrate,
- comparing the measurement results with simulation results from the simulation of the substrate,
- optimizing the simulation and renewed creation of a simulation of the substrate using the measurement results from the measurement of the substrate, in the event that there is a deviation of the measurement results from the simulation results, or calculating parameters of further substrates using the simulation created, in the event that the measurement results correspond to the simulation results.

Advantageously, the simulation created can be used for the optimization of desired layer thicknesses, structures and materials.

The invention furthermore relates to a device for measuring a multilayered substrate, particularly with at least one structure with critical dimensions, particularly with a surface structure with critical dimensions, having:

- means for measuring the substrate, and in particular the structure, using at least one measuring technology,
- means for creating a simulation of the substrate using the measurement results from the measurement of the substrate,
- means for comparing the measurement results with simulation results from the simulation of the substrate,
- means for the optimization of the simulation and renewed creation of a simulation of the substrate using the measurement results from the measurement of the substrate,
- means for analysing and optimizing further substrates (1, 1', 1") by reconstructing layer and/or structure parameters with the aid of the simulation created on the basis of measurement results from the measurement of the further substrates (1, 1', 1").

Advantageously, thin transparent or semi-transparent layers or two-layer systems or multilayer systems can be measured, wherein structured surfaces can also be measured. Thus, complex substrates can be measured with high accuracy.

In particular, it is suggested to offer a simultaneous reconstruction of the layer and structure parameters by means of a combination of measurement and simulation. The information content is increased by adding a plurality of measurement variables and/or a plurality of measuring methods. One such combined measuring method is preferably used with RCWA as a calculation method and enables a characterization of complex samples which contain a plurality of layers and structures by obtaining information about diffraction and phase and topographical information. The newly used methods deliver results with a realistic computing power and in an acceptable short computing time in process monitoring.

Alternative calculation methods for electromagnetic simulations for example are the FDTD (Finite Difference Time Domain) method and the finite element method (FEM).

Preferably, the measuring technology is at least one, preferably exactly one, of the following technologies:

- VUV/UV/VIS/NIR variable angle spectral ellipsometry (VASE) in reflection or transmission mode. The measuring range extends from vacuum ultraviolet (VUV) through to in the near infrared (NIR), from 146 nm to 1700 nm.
- IR variable angle spectral ellipsonnetry (VASE) in reflection or transmission mode. Here, the spectral measuring range extends from 1.7 μm to 30 μm.
- (polarized) reflectometry
- (polarized) scatterometry
- UV/VIS spectroscopy
- THz spectroscopy These measuring technologies are known in the prior art and are not explained in more detail. Specifically in the IR or mid IR (MIR) range, in addition to reflection or transmission measurements, measurements with attenuated total reflection are also possible in the ATR (attenuated total reflection) mode (ATR spectroscopy).

The configuration with a spectroscopic ellipsometer is the preferred configuration and is used as first measuring technology in a first embodiment according to the invention.

Preferably, an angle of incidence and/or a wavelength and/or a polarization state is/are varied and measured.

Preferably, rigorous coupled-wave analysis (RCWA) is used for creating the simulation.

Preferably, according to the invention, only one measuring technology is used, wherein the independent measurement variables angle of incidence and wavelength and the polarization state are varied and measured.

In a further embodiment, in which the systems to be investigated are less complex, the angle is not varied.

In a third embodiment according to the invention, in which the systems to be investigated are very complex, in addition to variable angle spectral ellipsometry, a second, and if necessary a third, etc., measuring technology is used. Which and how many measuring methods are combined depends on the substrates to be investigated and must be selected on a case-by-case basis in the course of model production. According to the invention, a combination of wavelength-resolved and angle-resolved measuring methods, such as scatterometry or ellipsometry lead to a higher accuracy of the simulations.

The following optical properties can be determined in a wide spectral range:
  refractive index (n)
  molar extinction coefficient (k)
  real and imaginary part of the dielectric function ($\varepsilon 1$, $\varepsilon 2$)
  absorption coefficient ($\alpha$)
  real and imaginary part of the complex optical conductivity ($\sigma 1$, $\sigma 2$)
  optical anisotropy These optical properties are known to the person skilled in the art and are not explained in more detail.

Preferably, the means for measurement comprises at least one optical device, particularly an ellipsometer and/or reflectometer and/or scatterometer and/or spectrometer.

Preferably, the device has at least one data processing unit and at least one data processing system for processing and saving the data which are obtained from the means for measuring the substrate.

Preferably, the means for measuring have at least one radiation source, particularly a laser or wide-band radiation source, at least one monochromator, at least one polarizer, at least one compensator, at least one substrate holder, at least one analyser, and at least one detector, wherein the at least one polarizer enables the setting of selected elliptical polarization states, particularly linear or circular.

Preferably, all means for measuring the substrate are arranged in the device.

Method Steps

In particular, the invention describes a method for characterizing multilayer systems with (surface) structuring, having a plurality of steps:

In a first step, a sufficiently large number of measurements is carried out for a selected, known, system (in the following also termed substrate), i.e. a produced sample. The samples may be multilayer systems with or without structures or surface structuring. According to the invention, wavelength-resolved and/or angle-resolved measurements are carried out in particular, wherein the polarization state is measured and varied.

The selected sample(s) are measured using at least one measuring technology, depending on complexity, wherein all components for carrying out the different measuring technologies are preferably present in the device according to the invention. If required, individual device components may be exchanged, added or removed. The information content of the reference signatures recorded is increased by adding a plurality of measuring methods. In an alternative, less preferred embodiment, the sample to be measured is transferred into a further measuring device, so that further measurements can be carried out using different measuring technologies.

According to the invention, the suitable measuring technologies for obtaining information are in particular scatterometry, ellipsometry, reflectometry, spectroscopy and/or diffractometry. The measurements can for example be carried out in the case of variable polarization of the measuring beam, in the case of change of the angle of incidence and in the case of change of the wavelength. According to the invention, a combination of wavelength-resolved and angle-resolved measuring methods in particular lead to a higher accuracy of the simulations. Furthermore, depending on the sample type and measuring method, the measurements may be carried out not only in reflection mode, but also in transmission mode, in order to obtain additional information and data.

The measuring technologies are also selected on the basis of the optical properties of the individual layers of a layer system. For certain wavelength ranges, a layer may be substantially transparent for example, whilst one or more further layers absorb or reflect more strongly.

In a further step, a suitable model is created on the basis of the recorded data, preferably using RCWA (rigorous coupled-wave analysis) as calculation method. In this case, newly developed complex simulation algorithms are used for model production. The simulations make it possible to take account of diverse effects in metrology, in that a comparison between measurement result and simulation result is carried out for known samples. Model-based measurements are used for that. If the measured sample includes a plurality of layers and (surface) structures, the complexity of the system and the number of parameters to be determined is increased.

The recurrent steps of measurement, model production or model optimization and simulation are required according to the invention. If the measurement results and simulation results do not match within a permissible range, the model must be optimized further. If measurement results and simulation results match within a permissible range, the simulation may be used for the analysis of further samples.

The configuration with a spectroscopic ellipsometer, for example VASE, is the preferred configuration according to the invention and is used as first measuring technology in a first embodiment according to the invention. Which and how many measuring methods are used must be determined individually for each system to be characterized. The measuring methods must deliver experimental measurement data which are sensitive for many of the interesting parameters, without there being too high a correlation of the parameters. Examples for parameters are the height and the width for surface structures and the layer thickness for an nth layer, for example.

RCWA is used for calculating the grid diffraction, wherein the sample is divided into a plurality of individual layers. According to the invention, the RCWA algorithms make it possible to determine the critical dimensions of the structures investigated. These are e.g. the height or depth of the structures, the width and the length of the structures, angles (e.g. side wall angle), residual layer thickness(es) and surface roughness. The measurements can be carried out for positive and/or for negative periodic structures.

If certain parameters are changed in the substrate to be characterized, these changes must effect a change in the spectral recordings. If different parameters effect an identical change of the experimental recordings, the correlations are too high and a unique assignment is not or is hardly possible. Then, the selection of the measuring technology/technologies must be optimized further. A possible correlation with unknown parameters is a further challenge in model production. A high repeatability in the production process of the samples to be investigated is a prerequisite in this case.

According to the invention, correlation analyses and sensitivity analyses are carried out in particular, in order to assess the quality of the reconstruction on the basis of the measurements carried out.

In a further step, the optimized model is used for the characterization of unknown samples, wherein the sample must already be assigned to known sample systems. The reconstruction of layers and structural dimensions takes place by means of a comparison between measured and simulated spectra. The simulated spectra are called upon as a data record for reconstructing the parameters sought.

The parameters are for example:
layer thicknesses from subnanometre to several micrometres
surface roughnesses
refractive index
electrical conductivity
absorption
polymerization state
mixture compositions
defects
optical anisotropy
material doping
morphology
critical dimensions of the structures investigated. These are e.g. the height or depth of the structures, the width and the length of the structures, angles (e.g. side wall angle), residual layer thickness(es) and surface roughness.

The developed and optimized model is not only used for calculating desired parameters of further analogous substrates and analogous (layer) materials, but also for optimizing desired layer thicknesses, structures and materials. Thus, a layer thickness or a structure dimension can for example be optimized on the basis of the desired parameter value using the model according to the invention.

Substrate with Multilayer Systems and/or (Surface) Structuring

Substrates, which have been processed or treated using the methods known in the semiconductor industry, particularly coated and/or imprinted and/or bonded and/or etched and/or treated with plasma and/or treated with light, for example lasers, etc., are termed samples. Master stamps, working stamps and microfluidic assemblies are also understood to be samples.

A substrate or semiconductor substrate is understood to mean a not yet separated, particularly round, semifinished product of the semiconductor industry. A wafer is also understood to be a substrate. Although the substrate can have any desired diameter, the substrate diameter is particularly 1 inch, 2 inches, 3 inches, 4 inches, 5 inches, 6 inches, 8 inches, 12 inches, 18 inches or larger than 18 inches. In particular embodiments, a substrate may also have a rectangular shape or at least a shape deviating from the circular form.

The samples to be characterized in particular contain one or more of the following components and/or coatings:
lacquers, particularly photoresists
anti-sticking layers (ASL)
first layers, such as primer layers for example
polymer layers
working stamp materials for imprint and nanoimprint methods (soft stamp or hard stamp materials)
master stamp materials
structured master stamps or hard stamps and structured hard materials which have been produced by electron beam lithography and/or chemical etching processes
layers with imprinted structures
structured coatings
semiconductor layers
oxide layers The method according to the invention is not limited to the above-mentioned samples and is generally suitable for multilayer systems with or without structuring with critical dimensions, as long as the sample can be measured using at least one of the measuring technologies according to the invention (ellipsometry, scatterometry, spectroscopy, diffractometry and reflectometry).

Preferred Applications

In addition to determining layer thicknesses and structures with critical dimensions, the methods of analysis (particularly RCWA) may be used for the following applications:
characterizing multilayer systems
fault analysis and fault detection (breakdown analysis)
characterizing anti-sticking layers and first layers
monitoring the chemical stability of materials, for example lacquers, working stamp materials, first layers, anti-sticking materials, etc.
monitoring the wear or erosion of materials, for example lacquers, working stamp materials, master stamp materials, first layers, anti-sticking materials, etc.
Monitoring the environmental wear of materials, for example lacquers, working stamp materials, master stamp materials, first layers, anti-sticking materials, etc.
monitoring oxidation or reduction processes of materials, for example lacquers, working stamp materials, master stamp materials, first layers, anti-sticking materials, etc.
characterizing the chemical composition of materials, for example lacquers, working stamp materials, master stamp materials, first layers, anti-sticking materials, etc.
characterizing the irradiation stability of materials, for example lacquers, working stamp materials, master stamp materials, first layers, anti-sticking materials, etc.
characterizing the thermal stability of materials, for example lacquers, working stamp materials, master stamp materials, first layers, anti-sticking materials, etc.
characterizing the durability of materials (ageing), for example lacquers, working stamp materials, master stamp materials, first layers, anti-sticking materials, etc.
characterizing the electrical conductivity of materials, for example lacquers, working stamp materials, master stamp materials, first layers, anti-sticking materials, etc.

characterizing the degree of curing of lacquers, working stamp materials and imprinting compounds generally characterizing the miscibility of materials, for example lacquers and working stamp materials characterizing mixtures and monitoring mixture separation characterizing the isotropy of materials monitoring the coating process and layer formation and/or film formation of, for example, lacquer coatings, working stamp material layers, master stamp materials, first layers, anti-sticking layers, etc.

characterizing 1D, 2D, 3D diffractive optical elements (DOEs) (printed directly onto transparent substrates or a polymer master), imprinted NIL structures, working stamps, hot-imprinted nanostructures, lithographic structures, microfluidic assemblies with critical dimensions characterizing and testing structured master stamps, structured hard stamps and structured hard materials which have been produced by electron beam lithography and/or chemical etching processes characterizing the spatial homogeneity of structures with critical dimensions characterizing layer formation and layer growth mechanisms (for example Volmer-Weber growth, etc.)

characterizing the shrinkage behaviour of 1D, 2D and/or 3D diffractive optical elements (DOEs), imprinted NIL structures, working stamps, hot-imprinted nanostructures, lithographic structures, microfluidic assemblies with critical dimensions characterizing additional coatings on 1D, 2D and/or 3D diffractive optical elements (DOEs), imprinted NIL structures, working stamps, master stamps, hot-imprinted nanostructures, lithographic structures, microfluidic assemblies with critical dimensions monitoring or characterizing cleaning processes for 1D, 2D and/or 3D diffractive optical elements (DOEs), imprinted NIL structures, working stamps, master stamps, hot-imprinted nanostructures, lithographic structures, microfluidic assemblies with critical dimensions detecting defects (for example air inclusions) in 1D, 2D and/or 3D diffractive optical elements (DOEs), imprinted NIL structures, working stamps, master stamps, hot-imprinted nanostructures, lithographic structures, microfluidic assemblies with critical dimensions and further multilayer systems characterizing etching processes in situ The method according to the invention can be used in a more generally formulated manner for quality control of the samples produced with multilayer systems and/or a structuring. For example, the quality of working stamps for nanoimprint lithography is characterized. These working stamps may include a plurality of layers with different thicknesses and materials. One of the layers is structured (e.g. soft stamp material layer). In this case, a plurality of parameters in each case may be relevant for the quality. The quality control may be carried out directly after production and/or after certain time intervals for checking the wear or ageing, e.g. in use.

The method according to the invention can be used for optimizing a production process, for monitoring the products produced until the desired properties, i.e. parameters are achieved in a reproducible manner. The spatial homogeneity of selected parameters may for example also be determined using the method according to the invention and called upon as a selection criterion.

The applications according to the invention are not limited to the above-mentioned multilayer systems (with or without structuring).

Device

The device comprises optical devices, such as an ellipsometer and/or reflectometer and/or scatterometer and/or spectrometer, and a data processing unit or a data processing system for processing and saving the data which are obtained from the optical devices.

The important components of the optical devices are: at least one radiation source (e.g. laser or wide-band radiation source), at least one monochromator, at least one polarizer, at least one compensator, a sample holder, at least one analyser, and at least one detector. The polarization optical element makes it possible to set selected elliptical polarization states (linear, circular, etc.). The measurements are not limited to reflection and can also be carried out in transmission or in ATR mode. For ATR measurements, a corresponding ATR holder for the substrate and/or ATR crystal and ATR optical elements are added as additional or alternative components.

According to the invention, wavelength-resolved and angle-resolved measurements in particular are carried out, wherein the polarization state can be varied. If the systems to be investigated are less complex, the angle is not varied, as wavelengths and polarization state are sufficient as information.

The configuration with a spectroscopic ellipsometer, wherein variable angle spectral ellipsometry is preferably selected, is the preferred configuration according to the invention and is used as first measuring technology in a first embodiment according to the invention.

The selected samples can be measured using a plurality of measuring technologies, depending on complexity, wherein all components for carrying out the different measuring technologies are preferably present in the device according to the invention. If required, individual device components may be exchanged, added or removed. The information content of the reference signatures recorded is increased, according to the invention, by adding a plurality of measuring methods. In an alternative embodiment, the sample to be measured is transferred to a further measuring device, so that further measurements can be carried out using different measuring technologies.

Typical components of ellipsometers are for example, a light source, a polarizer, possibly a compensator (for example a λ/4 plate), a sample holder, an analyser, if required, a monochromator, and a detector.

Further advantages, features and details of the invention result from the following description of preferred exemplary embodiments, as well as on the basis of the drawings.

In the figures, the same components or components with the same function are labelled with the same reference numbers. FIGS. 2 and 3 are not illustrated to scale, in order to facilitate the illustration.

DETAILED DESCRIPTION OF INVENTION

Figure 1A:
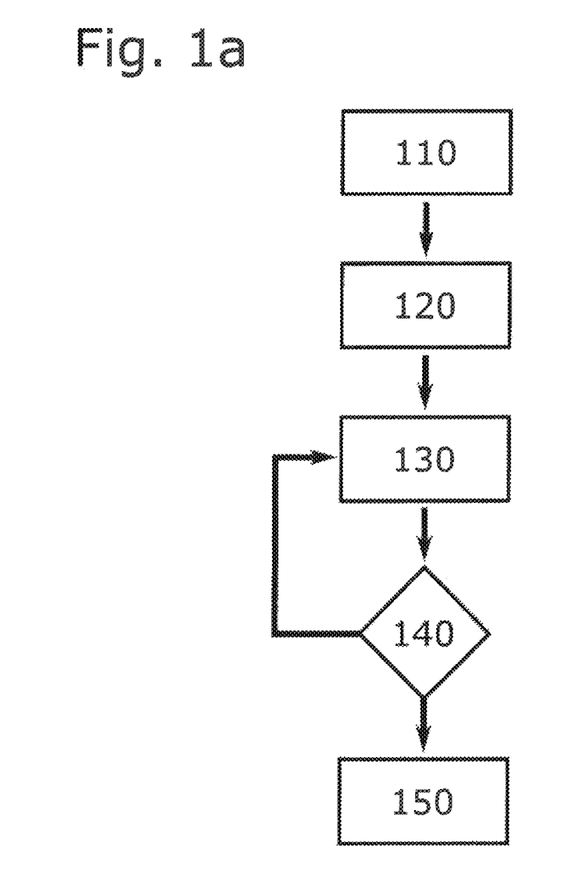
FIG. 1a shows a flow chart with method steps of an exemplary embodiment of a method according to the invention.

FIG. 1a shows a flow chart of the method according to the invention. For known samples (multilayer systems with structuring), a comparison is carried out between measurement result and simulation result. In this case, the recurrent method steps of measurement 120, model production 130 or model optimization 140 and renewed simulation are necessary.

In a first method step 110, a substrate (also termed sample in the following) is produced with a plurality of thin layers and a (surface) structuring. The system to be investigated is therefore known and is used for model production and optimization. If required, a plurality of accurately known reference substrates are produced and the measurement results are used for validating and optimizing the simulation model developed.

In a second method step 120, the substrate is irradiated with electromagnetic radiation with a defined angle of incidence and the reflected radiation is measured for example as a function of the wave number and/or the angle. The measurements are not limited to reflection and can also be carried out in transmission.

A plurality of measuring technologies can be used for increasing the reliability and/or accuracy of the calculation method. The suitable measuring technologies for obtaining information are in particular scatterometry, ellipsometry, reflectometry, spectroscopy and/or diffractometry. These various measuring technologies relate, inter alia, to the measurement of light reflected or diffracted at micro- and/or (sub-)nanostructured samples as a function of a device parameter, such as for example angle of incidence or light wavelength, wherein the polarization dependence of the measured values is utilized. Analogously, the individual layers of a multilayer system are directly or indirectly detected due to reflection and/or diffraction and/or scattering of the light at the boundary surfaces.

As a function of the layer thicknesses and the refractive index of the individual layers of the known defined sample, for the development of the simulation model, either the entire multilayer system is measured after finished production or, step by step, each individual layer is produced and measured one after the other.

In a first embodiment, the individual layers of the multilayer system have a layer thickness of more than 20 nm (greater than or equal to 20 nm) and the refractive index of the individual layers is known. In this embodiment, the entire multilayer system is measured after finished production. For example, an imprint stamp for the imprint or nanoimprint lithography with a structured imprint layer.

In a second embodiment, the sample contains very thin layers with a layer thickness below 20 nm with a known refractive index. For very thin layers, particularly layers with a layer thickness in the lower nm range to sub-nm range, each individual layer is produced and measured, before the next layer is produced thereon. In this embodiment, the sample is measured after each layer application, for example an ASL layer. All measured data of the sample, which has been measured layer by layer, are taken into account for the model production.

If required, layers with a layer thickness of more than 20 nm can also be measured individually during the production process of the sample, depending on the refractive index and the available material information.

In a third embodiment, a sample contains an intermediate layer with more than 20 nm layer thickness, but with an unknown refractive index. In this embodiment, measurements are carried out after application of individual layers with a layer thickness of more than 20 nm in each case, and for the entire multilayer system after finished production.

In ellipsometry, the polarization change is described with the aid of the measurable ellipsometric characteristics—the loss angle $\psi$ and the phase shift $\Delta$. As the optical parameters with $\psi$ and $\Delta$ cannot be determined directly, a parameterized model must be developed for a sample system to be investigated. To calculate the interaction of light with multilayer systems and nanostructures and microstructures, RCWA (rigorous coupled wave analysis) is preferably used according to the invention as calculation method. RCWA is used for calculating the grid diffraction, wherein the sample is divided into a plurality of individual layers. This model concept was developed and supplemented according to the invention.

The development according to the invention advantageously makes it possible, using the simulation model from method step 130, to simultaneously analyse the diffraction of incident (planar) waves at the multilayer system and at the structures. Multilayer systems and non-planar layers, i.e. structures, are advantageously determined with very high reliability and accuracy due to the use of polarized light with ellipsometry.

In a third method step 130, the data records of the selected measurement variables are used for the model production, so that a simulation of a multilayer system with (surface) structuring can be calculated. In this case, the deviation between the experimental data and the simulated data should be as low as possible (140). For a complex system according to the invention, as for example illustrated in FIG. 2a, with a plurality of layers and a surface structuring, the model developed in the method according to the invention may physically describe the sample correctly. Thus, a simulation with high reliability is enabled.

For known samples, which were produced in step 110, in a fourth method step 140, a comparison is carried out between measurement result and simulation result. In this case, the recurrent steps of measurement, model production or model optimization (model fitting) and renewed simulation are required. The aim of the adjustment is that the model, i.e. the generated data records fit the measured data records (i.e. experimental data) in the best possible manner. If this is not (yet) the case, the model is optimized further in method step 130. If this is the case, the model developed can be used in method step 150 for the determination of the desired parameters.

A mathematical analysis of the developed model systems can, if required, additionally be called upon specifically during the development of generic model systems.

Figure 1B:
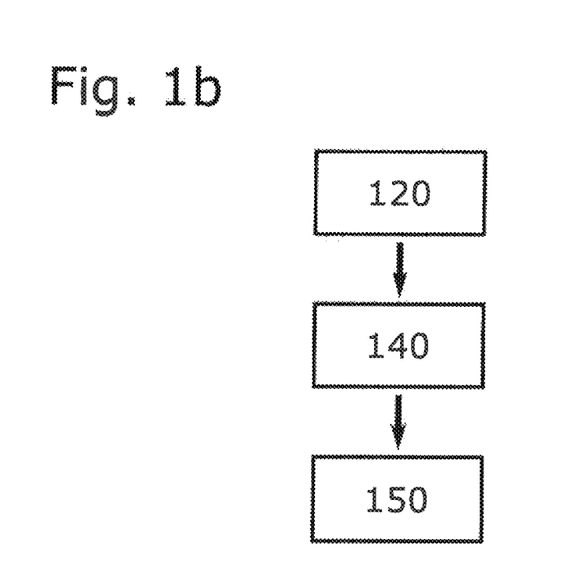
FIG. 1b shows a flow chart with method steps of an exemplary method according to the invention.

FIG. 1b shows a flow chart of the method according to the invention when applying a finished simulation model according to the invention for a multilayer system with (surface) structuring. Here, after system optimization, a developed model for routine simulations is available. The system parameters are determined. A known sample—i.e. the number of planar and/or non-planar (i.e. structured) layers and the layer materials are known—is measured according to the invention in method step 120 and, after the comparison of experimental and generated data records (140), the desired parameters are determined (150).

Figure 2A:
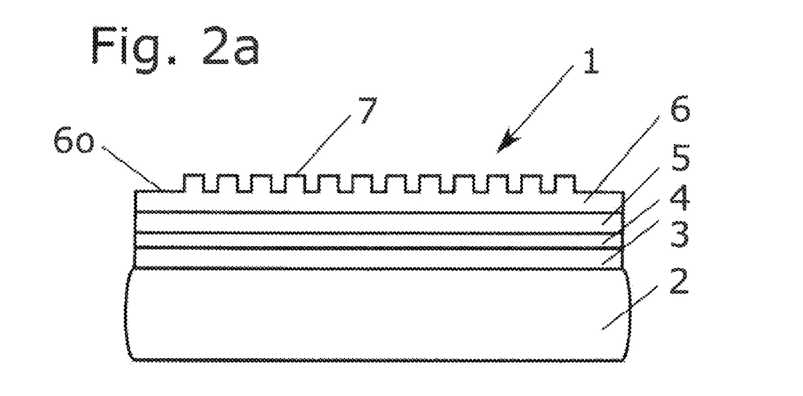
FIG. 2a shows a cross-sectional view of a substrate with multilayer system and a surface structuring with positive periodic structures.
Figure 2B:
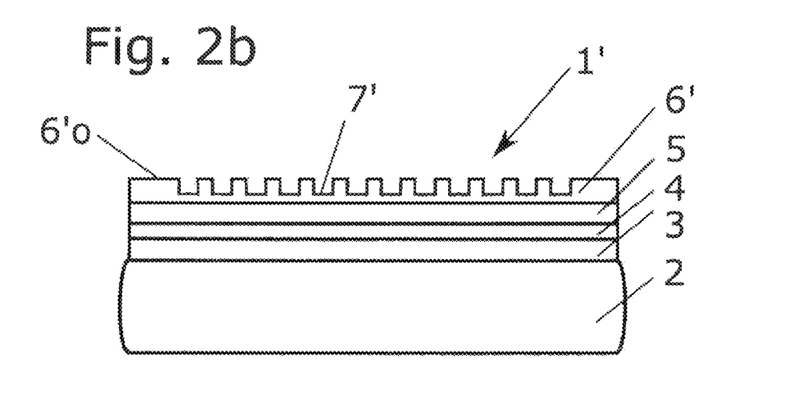
FIG. 2b shows a cross-sectional view of a second substrate with multilayer system and a surface structuring with negative periodic structures.
Figure 2C:
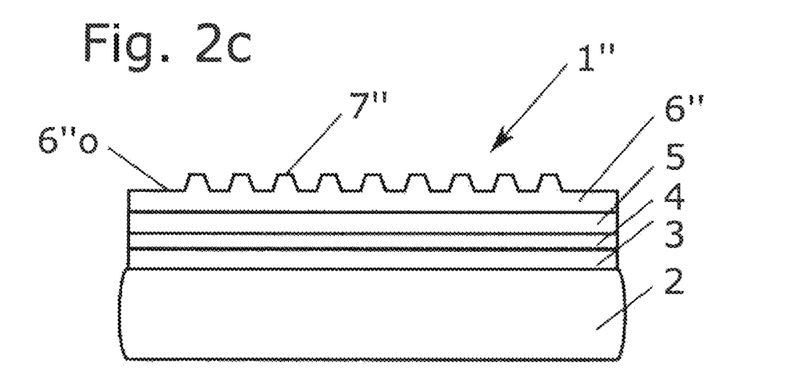
FIG. 2c shows a cross-sectional view of a third substrate with multilayer system and a surface structuring with positive trapezoidal structures.
Figure 3:
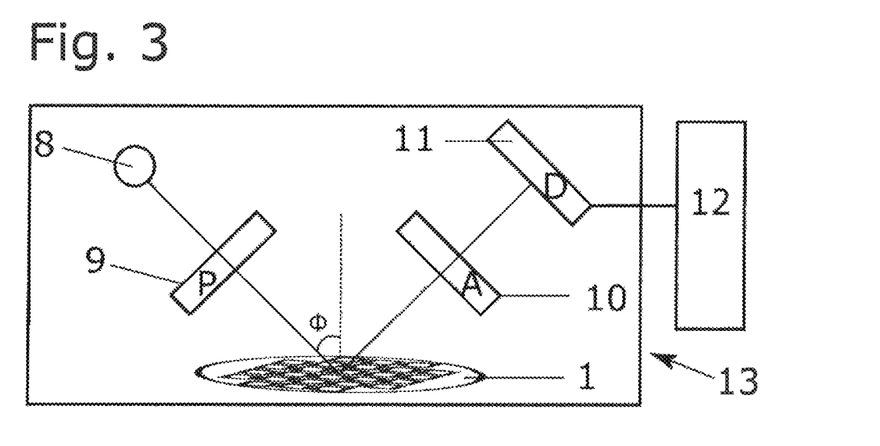
FIG. 3 shows a schematic illustration of the optical components of a device according to the invention in an exemplary embodiment.

FIG. 2*a* shows a cross-sectional view of a substrate 2 according to the invention, with a plurality of thin coatings 3-6 and a surface structuring 7. The number and the thickness of the coatings is not limited to the embodiments from FIGS. 2*a* to 2*c*. The thickness of the coatings is not illustrated to scale, in order to improve the illustration. FIGS. 2*a* to 2*c* show similar embodiments with different surface structurings 7, 7', 7". The last coating 6, 6', 6" can for example include a photoresist or an imprinting compound, which was structured by means of lithography or nanoimprint lithography. The structures 7, 7', 7" have dimensions in the nanometre range. The surface 6*o*, 6'*o*, 6"*o* of the structured coating defines the residual layer thickness.

FIG. 2*a* shows a multilayer system 1 with surface structuring with positive periodic structures 7.

FIG. 2*b* shows a further embodiment of a multilayer system 1' with surface structuring with negative periodic structures 7'.

FIG. 2*c* shows a third embodiment of a multilayer system 1" with a surface structuring with positive periodic trapezoidal structures 7".

If the surface is structured with micro- and/or nanostructures and/or subnanometre structures, the incident light impinges onto these (for the most part) periodic, extensive structures, which may represent an optical diffraction grid. The critical dimensions of the investigated structures 7, 7', 7" include the height or depth of the structures, the width and the length of the structures, the angles, for example the side wall angle, residual layer thickness(es) and the surface roughness.

Figure 2D:
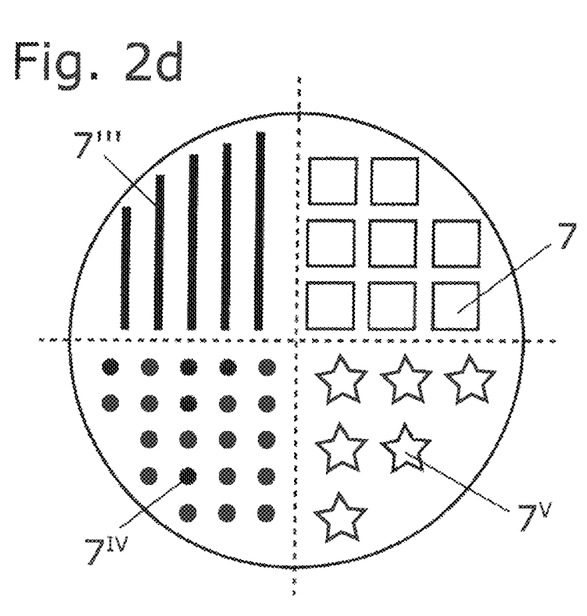
FIG. 2d shows a plan view of four exemplary embodiments of periodic structures (7 rectangular, 7''' linear, $7^{IV}$ circular and $7^V$ an irregular shape)

FIG. 2*d* shows by comparison, in a plan view of a plurality of cutouts, further possible surface structurings 7, 7''', $7^{IV}$ and $7^{V}$ according to the invention of a sample. According to the invention, models are developed, which allow a reliable characterization of complex multilayer systems with a (surface) structuring according to the structures from FIGS. 2*a* to 2*d*. The structures 7 are quadrilaterals, particularly squares. The structures 7''' are periodic extensive linear structures. In a further embodiment according to the invention, the structures $7^{IV}$ are circular. Also, structures with more complex or irregular structural forms, such as for example the structures $7^{V}$ from FIG. 2*d*, do not constitute a problem for the method according to the invention and are detected and correctly reproduced in the model production. The structuring is not limited to the embodiments shown.

According to the invention, the non-planar layer with a structuring is the uppermost layer 6, 6', 6" of a multilayer system 1, 1', 1". In an alternative embodiment, the non-planar layer with a structuring is located between two layers in the multilayer system. For example, a structured imprinting compound is coated with an ASL coating after imprinting for an application as working stamp. In a further alternative embodiment, a multilayer system contains more than one non-planar layer with a structuring.

FIG. 3 shows the optical components of a first embodiment of a device 13 according to the invention. A polarizer (P) 9 converts the non-polarized light of a radiation source 8 into linearly polarized light. After reflection at the sample 1, the radiation passes through an analyser (A) 10. The electromagnetic radiation is elliptically polarized upon reflection at the sample 1. The analyser 10 again changes the polarization of the reflected electromagnetic radiation, which then impinges on a detector (D) 11. In a first preferred embodiment, a polychromatic radiation source is used, so that a selected wavelength range is used in the measuring method. In an alternative embodiment, a monochromatic radiation is used, wherein a laser is preferably used as radiation source. A plurality of radiation sources may be present in the device at the same time and/or be exchanged if required.

Further optical components are for example, optical filters, a compensator (e.g. a λ/2 plate), monochromator, and different optical variable attenuators, which, if required, can be used depending on the measuring technology and/or wavelength range. These components are known to the person skilled in the art and are not described in more detail.

The measuring technologies according to the invention differ due to the arrangement and the type of the optical components. The analyser 10 may for example be constructed such that it can rotate.

In variable angle spectral ellipsometry (VASE), there is a broad coverage of wavelengths, in contrast to monochromatic ellipsometry. As a result, information content of the measured data and the accuracy of the simulations increase. A goniometer enables variable angular measurements. The combination of wavelength-resolved and angle-resolved measurements is the preferred embodiment and leads according to the invention to a higher reliability of the simulations. According to the invention, this combination is carried out with VASE as preferred measuring technology.

Furthermore, depending on the sample type and measuring method, the measurements may be carried out not only in reflection mode, but also in transmission mode, in order to obtain additional information and data, if required.

The device 13 according to the invention comprises optical devices and a data processing unit 12 for processing and saving the data, which are obtained from the optical devices.

A work-holding device (not illustrated) is used for holding and fixing the sample or the substrate. The work-holding device may, in a particular embodiment, be moved in a z direction, if required. Furthermore, a rotation and/or tipping over of the work-holding device is possible.

The work-holding device can be heated and its temperature controlled in a temperature range between 0° C. and 1000° C., preferably between 0° C. and 500° C., more preferably between 0° C. and 400° C., most preferably between 0° C. and 350° C. The work-holding device can alternatively be cooled using a cooling device. For example, in a first embodiment, the work-holding device may be cooled in a temperature range between −196° C. and 0° C. The temperature of the work-holding device may be adjusted using a temperature control arrangement.

The work-holding device may additionally have sensors (not illustrated), with the aid of which, physical and/or chemical properties can be measured. These sensors may be temperature sensors for example.

In a further preferred or else independent embodiment of the work-holding device, the work-holding device contains a liquid cell, which allows measurements under liquids. In a special embodiment, the liquid cell is a through-flow cell. Thus, multilayer systems with or without (surface) structuring can be measured in a liquid environment. According to the invention, in a special application, the electrochemical response of a multilayer system can be characterized using the liquid cell. The liquid cell can therefore also be constructed as an electrochemical cell, with reference electrode, counter-electrode and optical windows for the spectroscopically ellipsometric measurements.

The device 13 according to the invention can advantageously also be operated in a vacuum or at ambient pressure under a gas atmosphere. Preferably, the gas atmosphere is an inert gas atmosphere, for example nitrogen ($N_2$). Thus, multilayer systems with structuring, which are sensitive to liquid or to oxygen for example, can be investigated.

The device 13 according to the invention can preferably be evacuated and heated. The device has means for introducing one or more gaseous components. A loading device, preferably a sluice, allows the loading of the samples. In an alternative embodiment, the device can be built such that in situ measurements can be carried out.

Instead of the embodiment shown in FIG. 3, alternative embodiments are conceivable, which allow combinations of spectrometric and/or ellipsometric or scatterometric measuring methods, inter alia. All measuring technologies previously mentioned according to the invention are conceivable.

A computer-assisted data processing system 12 saves and processes the data, which are obtained from the optical devices, for simulating the multilayer systems (with or, if appropriate, without structuring) according to the invention using the simulation algorithms developed according to the invention. The simulation models according to the invention make it possible for the first time and using the suggested method to detect and to characterize a plurality of thin layers and a (surface) structuring at the same time and with high reliability.

REFERENCE LIST 1, 1', 1" Substrate/multilayer system with (surface) structuring
2 Substrate base material with refractive index $n_s$
3 First layer with refractive index $n_1$
4 Second layer with refractive index $n_2$
5 Third layer (nth layer) with refractive index $n_3$ or $n_n$
6, 6', 6" Uppermost layer with surface structuring and refractive index $n_o$
6o, 6'o, 6"o Surface of the uppermost layer
(7, 7', 7", 7''', $7^{IV}$, $7^{V}$)
Radiation source
Polarizer
Analyser
Detector
Control and computing unit
Optical device
110 Method step
120 Method step
130 Method step
140 Method step
150 Method step

What is claimed is:

1. A method for measuring a substrate having a plurality of layers, said method comprising:
producing the substrate with the plurality of layers, wherein the dimensions of the plurality of layers are known,
measuring and determining a layers of the substrate simultaneously using ellipsometry to obtain measurement results, the measurement results including a loss angle and a phase shift of the plurality of layers,
creating a simulation of the substrate using the measurement results from the measuring of the substrate,
comparing the measurement results with simulation results obtained from the simulation of the substrate, and
one of:
optimizing the simulation of the substrate and renewing creation of a simulation of the substrate using the measurement results from the measuring of the substrate, in the event that there is a deviation of the measurement results from the simulation results obtained from the simulation of the substrate, and
calculating parameters of further substrates, in the event that the measurement results correspond to the simulation results obtained from the simulation of the substrate,
wherein the ellipsometry is:
VUV/UV/VIS/NIR variable angle spectral ellipsometry (VASE) in reflection or transmission mode, wherein a measuring range extends from vacuum ultraviolet (VUV) through to near infrared (NIR), from 146 nm to 1700 nm,
IR variable angle spectral ellipsometry (VASE) in reflection or transmission mode, wherein a spectral measuring range extends from 1.7 µm to 30 µm, or a combination thereof.

2. The method according to claim 1, wherein an angle of incidence and/or a wavelength and/or a polarization state is/are varied and measured when measuring the substrate.

3. The method according to claim 1, wherein mathematical algorithms are used for the creating of the simulation of the substrate.

4. A device for measuring a substrate having a plurality of layers, said device comprising:
at least one optical device selected from the group consisting of an ellipsometer, a reflectometer, a scatterometer, and a spectrometer, the at least one optical device being configured to measure and determine the layers of the substrate simultaneously using ellipsometry to obtain measurement results, the measurement results including a loss angle and a phase shift of the plurality of layers; and
a computer-assisted data processing system configured to save the obtained measurement results, create a simulation of the substrate using the saved measurement results to obtain simulation results, compare the saved measurement results with the obtained simulation results, optimize the created simulation of the substrate and create a renewed simulation of the substrate using the saved measurement results, and analyze and optimize further substrates by reconstructing layer and/or structure parameters of the substrate using the renewed simulation, on the basis of measurement results from measuring the further substrates using the at least one optical device,
wherein the ellipsometry is:
VUV/UV/VIS/NIR variable angle spectral ellipsometry (VASE) in reflection or transmission mode, wherein a measuring range extends from vacuum ultraviolet (VUV) through to near infrared (NIR), from 146 nm to 1700 nm,
IR variable angle spectral ellipsometry (VASE) in reflection or transmission mode, wherein a spectral measuring range extends from 1.7 µm to 30 µm, or a combination thereof.

5. The device according to claim 4, wherein the at least one optical device has at least one radiation source, at least one monochromator, at least one polarizer, at least one compensator, at least one substrate holder, at least one analyser, and at least one detector, and wherein the at least one polarizer enables the setting of selected elliptical polarization states.

6. The device according to claim 4, wherein the at least one optical device is one of a plurality of optical devices selected from the group consisting of an ellipsometer, a reflectometer, a scatterometer, and a spectrometer, the plurality of optical devices being configured to measure the substrate, all of said optical devices being arranged in the device.

7. The method according to claim 1, wherein the substrate having the plurality of layers includes at least one structure.

8. The method according to claim 7, wherein the at least one structure is a surface structure.

9. The method according to claim 8, wherein the surface structure is on an uppermost layer of the plurality of layers.

10. The method according to claim 3, wherein the mathematical algorithms include RCWA (rigorous coupled-wave analysis).

11. The device according to claim 4, wherein the substrate having the plurality of layers includes at least one structure.

12. The device according to claim 5, wherein the at least one radiation source includes a laser or wide-band radiation source.

13. The device according to claim 5, wherein the at least one polarizer enables the setting of selected linear or circular elliptical polarization states.

* * * * *